(12) United States Patent
Wang

(10) Patent No.: US 9,918,435 B2
(45) Date of Patent: Mar. 20, 2018

(54) TREE SHEAR CAPABLE OF REDUCING OPENING DEGREE OF HANDLES THEREOF

(71) Applicant: Kuang Pin Wang, Taichung (TW)

(72) Inventor: Kuang Pin Wang, Taichung (TW)

( * ) Notice: Subject to any disclaimer, the term of this patent is extended or adjusted under 35 U.S.C. 154(b) by 377 days.

(21) Appl. No.: 14/863,540

(22) Filed: Sep. 24, 2015

(65) Prior Publication Data

US 2017/0086384 A1   Mar. 30, 2017

(51) Int. Cl.
*A01G 3/025* (2006.01)
*A01G 3/047* (2006.01)
*B25G 1/04* (2006.01)
*B26B 13/26* (2006.01)

(52) U.S. Cl.
CPC ............ *A01G 3/0251* (2013.01); *A01G 3/025* (2013.01); *A01G 3/047* (2013.01); *B25G 1/04* (2013.01); *B26B 13/26* (2013.01); *Y10T 16/473* (2015.01)

(58) Field of Classification Search
CPC ...... A01G 3/025; A01G 3/0251; A01G 3/047; A01G 3/0475; A01G 3/081; B23D 29/02; B23D 29/023; B23D 29/026; B25G 1/04; B26B 13/26; B26B 17/02; Y10T 16/473
USPC ......... 30/186, 192, 244–246, 251, 254, 340, 30/341; 16/429
See application file for complete search history.

(56) References Cited

U.S. PATENT DOCUMENTS

| | | | | |
|---|---|---|---|---|
| 483,928 A | * | 10/1892 | Kern | A01G 3/025 30/246 |
| 832,804 A | * | 10/1906 | Oneal et al. | B26B 17/02 30/193 |
| 1,607,470 A | * | 11/1926 | McKenney | A01G 3/0251 30/193 |
| 3,091,841 A | * | 6/1963 | Wurzel | B25B 27/205 29/229 |
| 3,273,240 A | * | 9/1966 | Florian | A01G 3/0251 30/192 |
| 5,159,757 A | * | 11/1992 | Weid et al. | A01G 3/0251 30/249 |
| 9,089,978 B2 | * | 7/2015 | Carmichael et al. | B26B 13/26 |
| 2008/0016700 A1 | * | 1/2008 | Hernandez et al. | B26B 17/02 30/190 |
| 2013/0185945 A1 | * | 7/2013 | Wang | B25G 1/04 30/341 |

FOREIGN PATENT DOCUMENTS

| | | | |
|---|---|---|---|
| FR | 2 928 573 | * | 9/2009 |
| JP | 3-139386 | * | 6/1991 |

* cited by examiner

*Primary Examiner* — Clark F Dexter
(74) *Attorney, Agent, or Firm* — Rosenberg, Klein & Lee

(57) ABSTRACT

A tree shear capable of reducing an opening degree of handles thereof, includes a shearing part, a first handle and a second handle. The shearing part includes a first blade and a second blade pivoted with each other. The first handle is connected with a first blade, the second handle has a front section and a rear section sleeved with each other, and the front section is connected with the second blade. A link rod has an end pivoted with the first handle and other end pivoted with the rear section of the second handle. While the two handles are opened, the link rod affects the front section of the second handle to move relative to the rear section of the second handle, so as to adjust a length of the second handle to reduce the opening degree of the two handles.

10 Claims, 7 Drawing Sheets

TREE SHEAR CAPABLE OF REDUCING OPENING DEGREE OF HANDLES THEREOF

BACKGROUND OF THE INVENTION

1. Technical Field

The present invention relates to a shear structure, more particularly to a tree shear for cutting a branch of a plant.

2. Description of Related Art

A tree shear is used to cut a branch of a plant. Operating the tree shear usually requires a larger force, so the tree shear includes longer handles as arms of force to achieve an objective of saving force. There are many commercially available tree shears which each has handles with adjustable lengths, most of their ways of adjusting the lengths of the handles are different, but their adjustment concepts usually involve extendable pipe structures and a controlling device to fasten lengths of the pipes.

However, when the tree shear is opened, longer handles may cause an excessive opening degree and the user must open hands greatly to operate the tree shear. Longer handles can provide a force-saving effect, but the handles with the excessive large opening degree are non-ergonomic and hard to operate opening and closing actions for cutting. In addition, the controlling device for adjusting the lengths of the handles cannot be controlled during cutting operation, so it is not convenient to use a conventional tree shear.

SUMMARY OF THE INVENTION

A primary objective of the present invention is to provide a tree shear capable of reducing an opening degree of handles thereof. The handle has an extendable structure and can be guided by a link rod, so the lengths of the handles can be adjusted while the handles are opened. Therefore, the opening degree of the handles can be reduced, and the tree shear can be more ergonomic and the force for cutting can be saved.

To achieve the primary objective, the present invention provides a tree shear capable of reducing an opening degree of handles thereof. The tree shear includes a shearing part, a first handle, a second handle and a first link rod. The shearing part includes a first blade and a second blade pivoted with each other. The first handle is connected with the first blade. The second handle has a second front section and a second rear section. The second front section is connected with the second blade, and the second front section and the second rear section are sleeved with each other and movable relative to each other, so as to adjust a length of the second handle. The first link rod has an end pivoted with the first handle and another end pivoted with the second rear section.

In an embodiment, the first handle is formed with a first front pivot member disposed at an end thereof connected with the first blade, and the second rear section is formed with a second rear pivot member disposed at an end thereof near the second front section, and two ends of the first link rod are respectively pivoted with the first front pivot member and the second rear pivot member.

Moreover, the first handle has a first front section and a first rear section, the first front section is connected with the first blade, and the first front section and the first rear section are sleeved with each other and movable relative to each other, so as to adjust a length of the first handle. The first link rod is connected with the first front section and the second rear section, and the first rear section and the second front section are connected via a second link rod.

The first rear section is a hollow pipe, and the first front section is slidably inserted into the first rear section. The second rear section is a hollow pipe, and the second front section is slidably inserted into the second rear section.

The first rear section is formed with a first rear pivot member, the second front section is formed with a second front pivot member disposed at an end thereof connected with the second blade, and two ends of the second link rod are respectively pivoted with the first rear pivot member and the second front pivot member. Moreover, the first front pivot member and the first rear pivot member are disposed at a side of the first handle facing the second handle, and the second front pivot member and the second rear pivot member are disposed at a side of the second handle facing the first handle.

A reference plane passing through centers of the first handle and the second handle both is defined, the first front pivot member and the second rear pivot member connected with the first link rod are located at a side of the reference plane, and the first rear pivot member and the second front pivot member connected with the second link rod are located at an opposite side of the reference plane.

One of the first link rod and the second link rod is formed by two rods which are pivoted with each other, and a stop member is fastened at both sides of a location where the two rods are pivoted, so as to prevent excessive pivot of the two rods.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
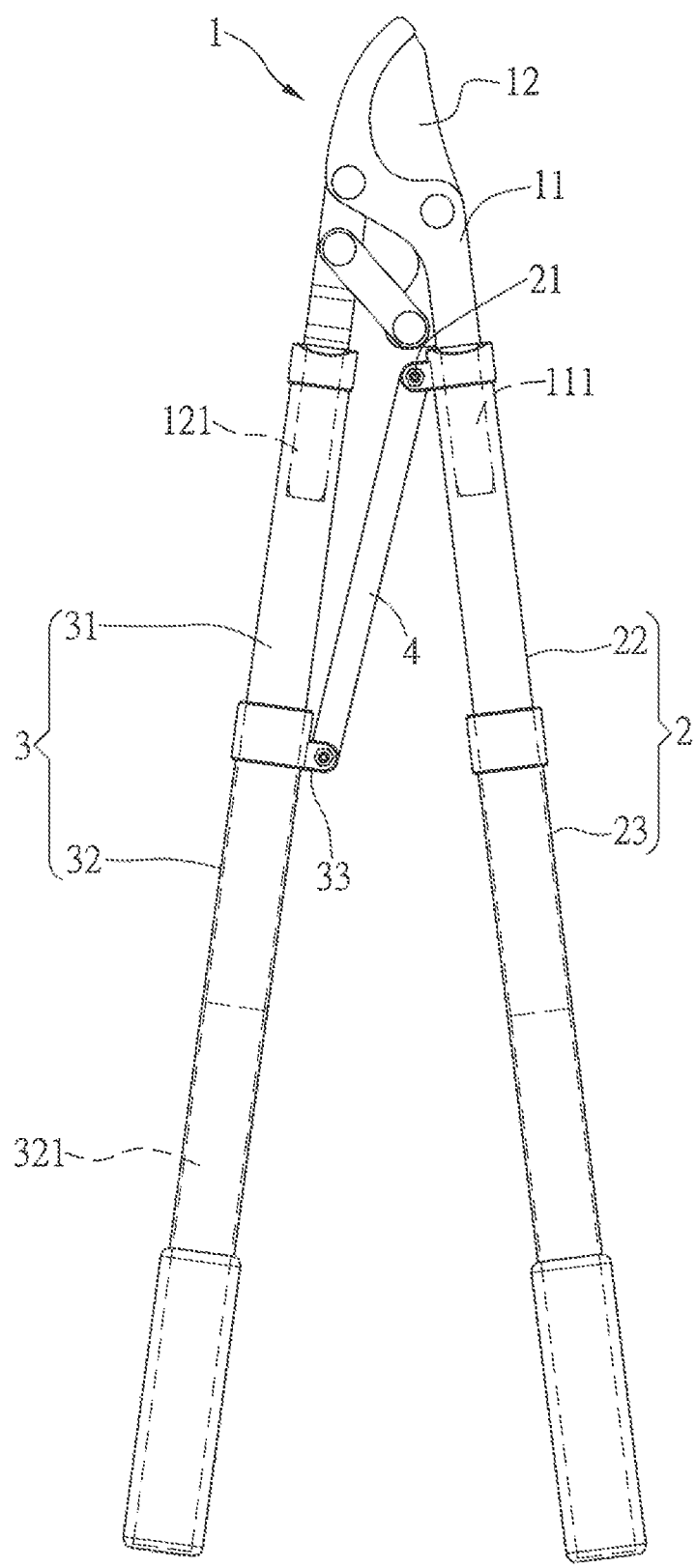
FIG. 1 is a plan view of a first embodiment of the present invention.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
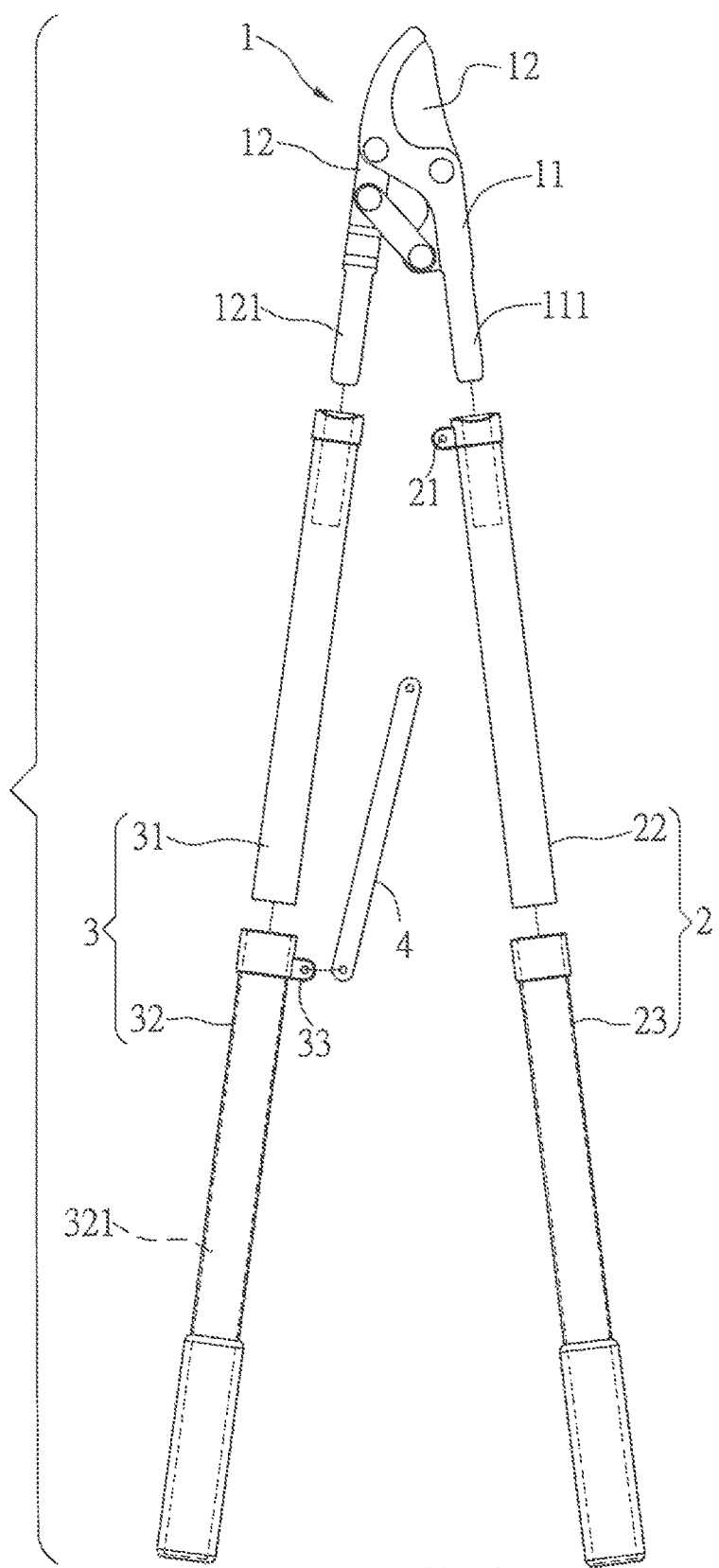
FIG. 2 is an exploded view of the first embodiment of the present invention.

Please refer to FIGS. 1 and 2 which respectively show a tree shear of a first embodiment of the present invention. The tree shear capable reducing an opening degree of handles thereof, includes a shearing part 1, a first handle 2 and a second handle 3. The shearing part 1 is formed by pivoting a first blade 11 and a second blade 12. A user can control the two blades 11 and 12 to oppositely pivotally rotate to cut the branch of a plant. The first blade 11 and the second blade 12 are respectively formed with connecting parts 111 and 121 extended therefrom to combine with the first handle 2 and the second handle 3. The user can operate the two handles 2 and 3 to control the two blades 11 and 12.

In detail, the connecting part 111 of the first blade 11 is fastened with a top end of the first handle 2; on the other hand, the connecting part 121 of the second blade 12 is fastened with a top end of the second handle 3. The first handle 2 has a first front section 22 and a first rear section 23 which have structures capable of being sleeved with each other or connected with each other integrally. The second handle 3 includes a second front section 31 and a second rear section 32, the second blade 12 is combined with the second front section 31, and the second front section 31 and the second rear section 32 are sleeved with each other. In this embodiment, the second rear section 32 is a hollow pipe defining a chamber 321 inside. The second front section 31 is inserted into the chamber 321 and slidable in the chamber 321. By means of the structural design, the entire length of the second handle 3 can be adjusted by changing relative locations of the second front section 31 and the second rear section 32.

In addition, the first handle 2 and the second handle 3 are connected through a first link rod 4. In this embodiment, the first handle 2 is formed with a first front pivot member 21 disposed at an end thereof connected with the first blade 11, and a second rear pivot member 33 is disposed at the second rear section 32. Two ends of the first link rod 4 are respectively pivoted with the first front pivot member 21 and the second rear pivot member 33. Moreover, the first front pivot member 21 is disposed at a side of the first handle 2 facing the second handle 3, the second rear pivot member 33 is disposed at a side of the second rear section 32 facing the first handle 2, thereby arranging the first link rod 4 between the first handle 2 and the second handle 3.

Figure 3:
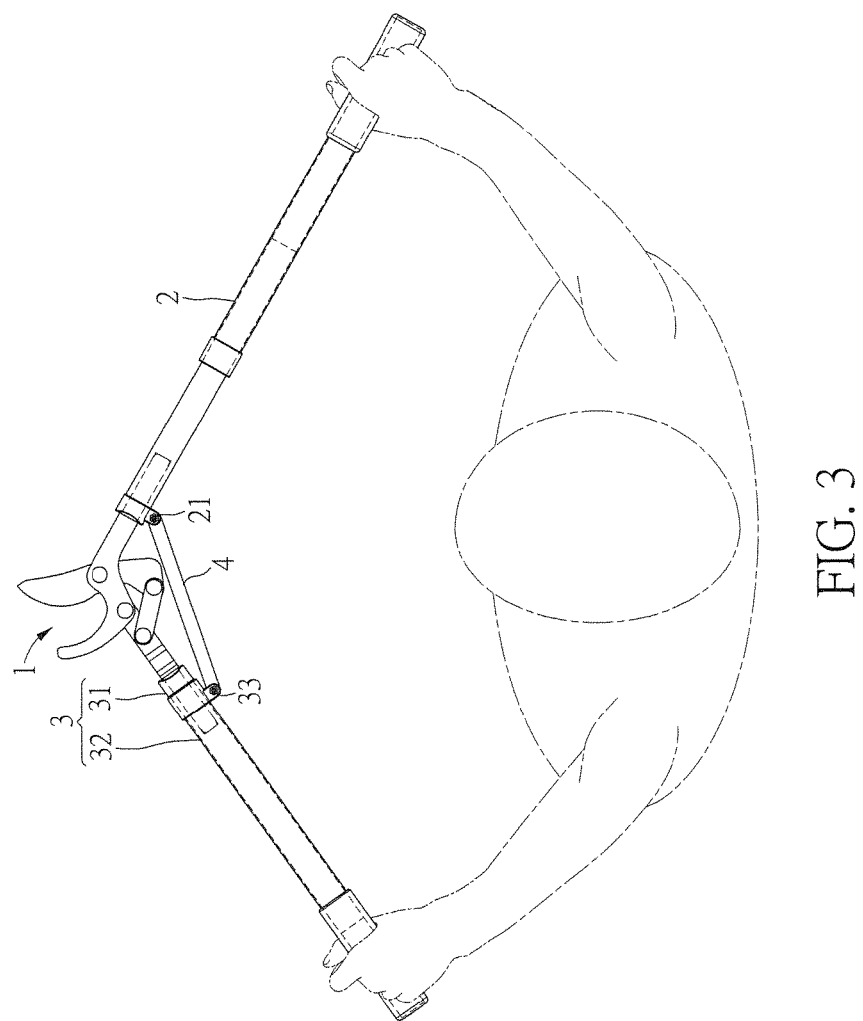
FIG. 3 is a schematic view of a usage status of the first embodiment of the present invention.

While holding the two handles 2 and 3 by two hands to open the tree shear, as shown in FIG. 3, the user can control the first handle 2 and the second handle 3 to gradually move apart from each other, the first link rod 4 affects the second rear section 32 to move relative to the second front section 31 because of the constant length of the first link rod 4, so that the second front section 31 is gradually received into the second rear section 32 to reduce the entire length of the second handle 3. Hereby, a distance between the first handle 2 and the second handle 3, that is an opening degree between the two handles 2 and 3, is decreased along with the shortened length of the second handle 3, so that the structural status of the tree shear after two handles 2 and 3 are opened, is more ergonomic, and it saves more forces to close the two handles 2 and 3 for cutting.

Figure 4:
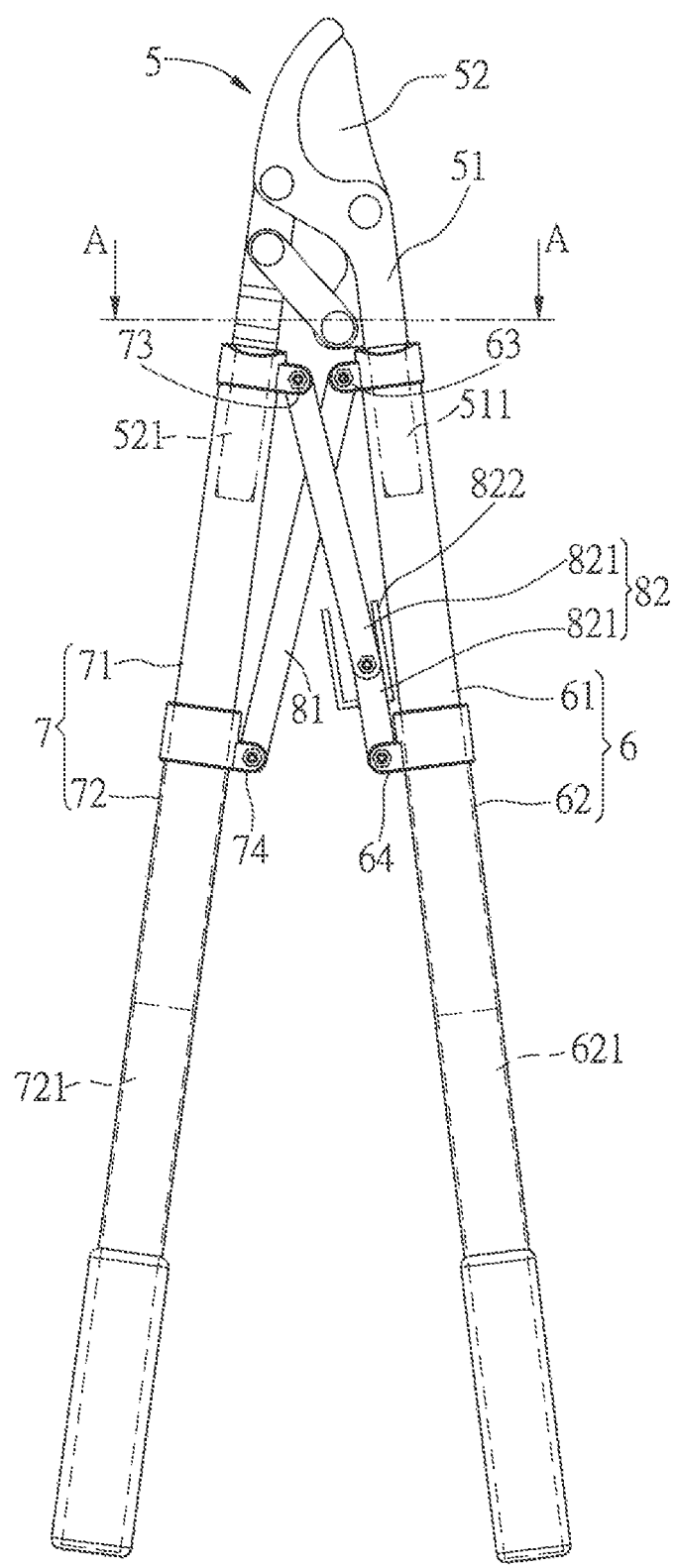
FIG. 4 is a plan view of a second embodiment of the present invention.
Figure 5:
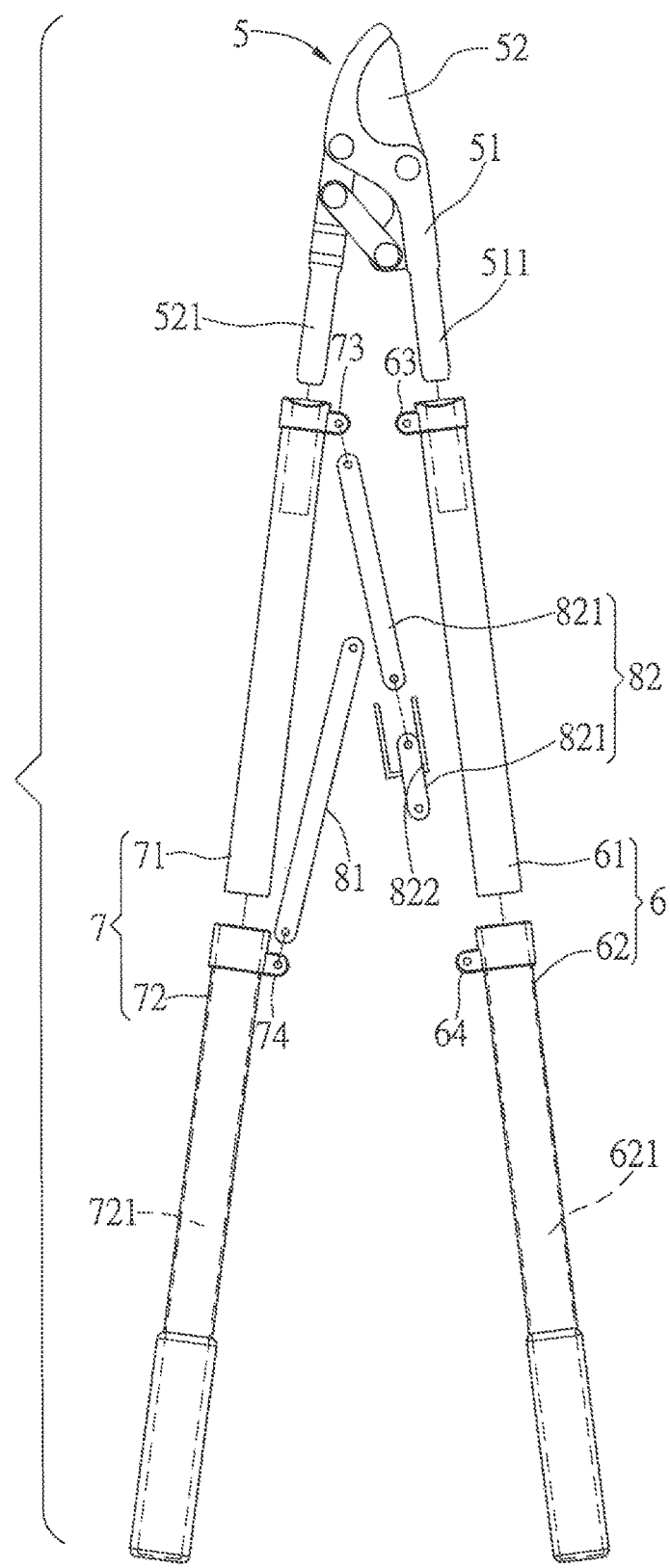
FIG. 5 is an exploded view of the second embodiment of the present invention.

Please refer to FIGS. 4 and 5 which show a second embodiment of the present invention. The tree shear of the second embodiment includes a shearing part 5, a first handle 6 and a second handle 7. The shearing part 5 is formed by pivoting a first blade 51 and a second blade 52, and the user can control the two blades 51 and 52 to oppositely pivotally rotate to cut a branch of a plant. The first blade 51 and the second blade 52 are respectively formed with connecting parts 511 and 521 extended therefrom to respectively combine with the first handle 6 and the second handle 7, so that the user can operate the two handles 6 and 7 to control the two blades 51 and 52.

The first handle 6 has a first front section 61 and a first rear section 62. The connecting part 511 of the first blade 51 is fastened with a top end of the first front section 61, and the first front section 61 and the first rear section 62 are sleeved with each other. In this embodiment, the first rear section 62 is a hollow pipe defining a first chamber 621 inside. The first front section 61 is inserted into the first chamber 621 and slidable in the first chamber 621. By means of the structural design, an entire length of the first handle 6 can be adjusted by changing relative locations of the first front section 61 and the first rear section 62.

The second handle 7 has a second front section 71 and a second rear section 72. The connecting part 521 of the second blade 52 is fastened with a top end of the second front section 71, and the second front section 71 and the second rear section 72 are sleeved with each other. In this embodiment, the second rear section 72 is a hollow pipe defining a second chamber 721 inside. The second front section 71 is inserted into the second chamber 721 and slidable in the second chamber 721. By means of the structural design, an entire length of the second handle 7 can be adjusted by changing relative locations of the second front section 71 and the second rear section 72.

The first handle 6 and the second handle 7 are connected via a first link rod 81 and a second link rod 82. In this embodiment, the first front section 61 is formed with a first front pivot member 63 disposed at a top end thereof and the first rear section 62 is formed with a first rear pivot member 64. The second front section 71 is formed with a second front pivot member 73 disposed at a top end thereof, and the second rear section 72 is formed with a second rear pivot member 74. Two ends of the first link rod 81 are respectively pivoted with the first front pivot member 63 and the second rear pivot member 74 to connect with the first front section 61 and the second rear section 72. Two ends of the second link rod 82 are respectively pivoted with the first rear pivot member 64 and the second front pivot member 73, so as to connect the first rear section 62 and the second front section 71. Moreover, the first front pivot member 63 and the first rear pivot member 64 are respectively disposed on a side of the first handle 6 facing the second handle 7, and the second front pivot member 73 and the second rear pivot member 74 are respectively disposed on a side of the second handle 7 facing the first handle 6, thereby arranging the first link rod 81 and the second link rod 82 between the first handle 6 and the second handle 7.

Figure 6:
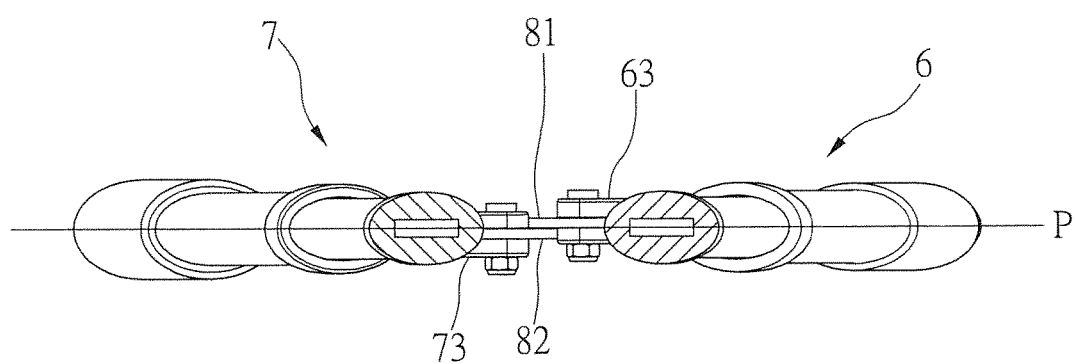
FIG. 6 is a cross-sectional view taken along a line A-A shown in the FIG. 4.

In addition, the first link rod 81 and the second link rod 82 are arranged in cross, and the thicknesses of the first link rod 81 and the second link rod 82 cause that the pivot members 63, 64, 73 and 74 connected with the two link rods 81 and 82 are not located at the relative positions on the two handles 6 and 7. In detail, as shown in FIG. 6, a reference plane P passing through centers of the first handle 6 and the second handle 7 is defined. The first front pivot member 63 and the second rear pivot member (not shown in FIG. 6) connected with the first link rod 81 are located at a side of the reference plane P, and the first rear pivot member 73 and the second front pivot member (not shown in FIG. 6) connected with the second link rod 82 are located at an opposite side of the reference plane P, thereby preventing the interference between the first link rod 81 and the second link rod 82 between the two handles 6 and 7.

On the other hand, one of the first link rod 81 and the second link rod 82 is formed by two rods which are pivoted with each other. In this embodiment, the second link rod 82 is formed by rods 821 which are pivoted with each other. In addition, a stop member 822 is fastened at both sides of a location where the two rods 821 are pivoted, to prevent excessive pivot of the two rods 821.

Figure 7:
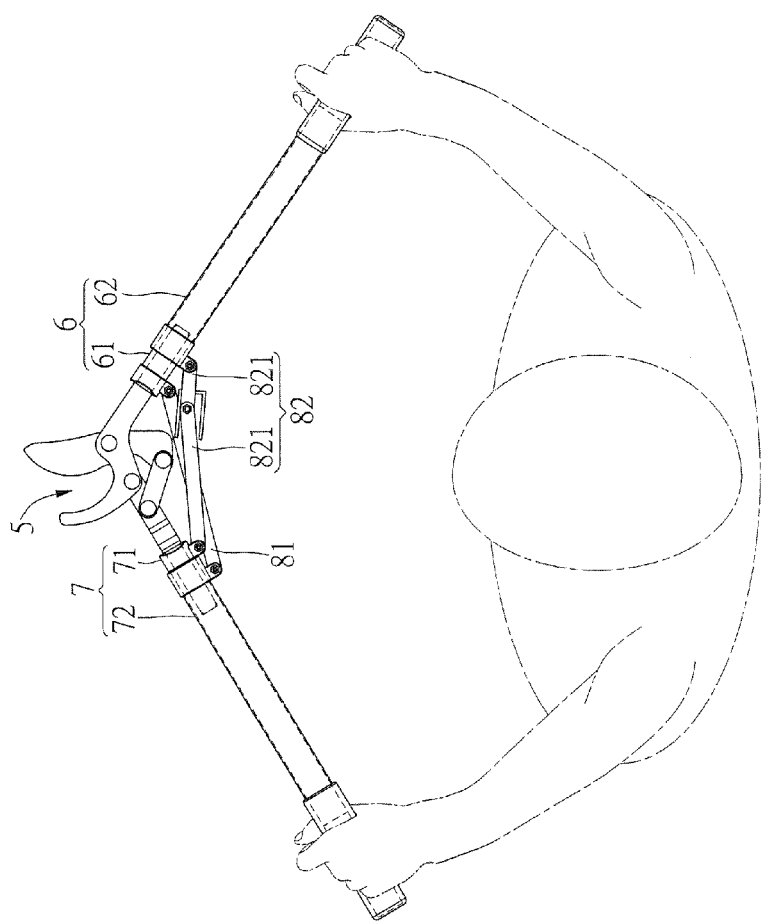
FIG. 7 is a schematic view of a usage status of the second embodiment of the present invention.

As shown in FIG. 7, while holding the two handles 6 and 7 by two hands, the user can control the first handle 6 and the second handle 7 to gradually move apart from each other. Because of the constant length of the first link rod 81 and the second link rod 82, the first link rod 81 affects the first front section 61 and the second rear section 72, and the second link rod 82 affects the first rear section 62 and the second front section 71 at the same time, so that the first front section 61 is moved relative to the first rear section 62 to be gradually received into the first rear section 62, and the second front section 71 is moved relative to the second rear section 72 to be gradually received into the second rear section 72, thereby respectively reducing the entire lengths of the first handle 6 and the second handle 7. Hereby, a distance between the first handle 6 and the second handle 7, that is an opening degree between the two handles 6 and 7, is decreased along with the shortened lengths of the first handle 6 and the second handle 7, so that the structural status of the tree shear after two handles 6 and 7 are opened, is more ergonomic, and it saves more forces to close the two handles 6 and 7 for cutting.

In addition, during the process of closing the two handles 6 and 7, the slight pivot between the two rods 821 of the second link rod 82 can make the closing action of the two handles 6 and 7 more smooth.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

The invention claimed is:

1. A tree shear capable of reducing an opening degree of handles thereof, comprising:
   a shearing part comprising a first blade and a second blade pivoted with each other;
   a first handle disposed rearwardly of the shearing part and connected with the first blade;
   a second handle disposed rearwardly of the shearing part, wherein the first and second handles are connected to the shearing part such that when the first and second handles are moved away from each other, the first and second blades move away from each other, and when the first and second handles are moved toward one another, the first and second blades move toward one another to cut a workpiece, and
   wherein the second handle has a second front section proximal to the second blade and a second rear section distal to the second blade, wherein the second front section is connected with the second blade, the second front section and the second rear section are sleeved with each other and movable relative to each other so as to adjust a length of the second handle; and
   a first link rod having an end pivoted to the first handle and another end pivoted to the second rear section,
   wherein during pivoting of the first and second blades away from each other via the movement of the first and second handles away from each other, the first link rod causes the second rear section to move along the second front section toward the second blade, and during pivoting of the first and second blades toward each other via the movement of the first and second handles toward each other, the first link rod causes the second rear section to move along the second front section away from the second blade.

2. The tree shear according to claim 1, wherein the second rear section is a hollow pipe, and the second front section is slidably inserted into the second rear section.

3. The tree shear according to claim 1, wherein the first handle is formed with a first front pivot member disposed at an end thereof connected with the first blade, and the second rear section is formed with a second rear pivot member disposed at an end thereof near the second front section, and two ends of the first link rod are respectively pivoted with the first front pivot member and the second rear pivot member.

4. The tree shear according to claim 3, wherein the first front pivot member is disposed at a side of the first handle facing the second handle, and the second rear pivot member is disposed at a side of the second handle facing the first handle.

5. The tree shear according to claim 1, wherein the first handle has a first front section and a first rear section, the first front section is connected with the first blade, and the first front section and the first rear section are sleeved with each other and movable relative to each other, so as to adjust a length of the first handle, and the first link rod is connected with the first front section and the second rear section.

6. The tree shear according to claim 5, wherein the first rear section and the second front section are connected via a second link rod.

7. The tree shear according to claim 6, wherein the first front section is formed with a first front pivot member disposed at an end thereof connected with the first blade, the first rear section is formed with a first rear pivot member, the second front section is formed with a second front pivot member disposed at an end thereof connected with the second blade, and the second rear section is formed with a second rear pivot member;
   wherein two ends of the first link rod are respectively pivoted with the first front pivot member and the second rear pivot member, and two ends of the second link rod are respectively pivoted with the first rear pivot member and the second front pivot member.

8. The tree shear according to claim 7, wherein the first front pivot member and the first rear pivot member are disposed at a side of the first handle facing the second handle, and the second front pivot member and the second rear pivot member are disposed at a side of the second handle facing the first handle.

9. The tree shear according to claim 8, wherein a reference plane passing through centers of the first handle and the second handle both is defined, the first front pivot member and the second rear pivot member connected with the first link rod are located at a side of the reference plane, and the first rear pivot member and the second front pivot member connected with the second link rod are located at an opposite side of the reference plane.

10. The tree shear according to claim 6, wherein one of the first link rod and the second link rod is formed by two rods which are pivoted with each other, and a stop member is fastened at both sides of a location where the two rods are pivoted, so as to prevent excessive pivot of the two rods.

* * * * *